United States Patent
Schaef et al.

(10) Patent No.: US 9,091,156 B2
(45) Date of Patent: Jul. 28, 2015

(54) DOWNHOLE FLUID INJECTION SYSTEMS, $CO_2$ SEQUESTRATION METHODS, AND HYDROCARBON MATERIAL RECOVERY METHODS

(75) Inventors: Herbert T. Schaef, Richland, WA (US); B. Peter McGrail, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 469 days.

(21) Appl. No.: 13/410,696

(22) Filed: Mar. 2, 2012

(65) Prior Publication Data

US 2012/0222870 A1    Sep. 6, 2012

Related U.S. Application Data

(60) Provisional application No. 61/448,879, filed on Mar. 3, 2011.

(51) Int. Cl.
*E21B 43/00* (2006.01)
*E21B 21/00* (2006.01)
*E21B 43/16* (2006.01)
(Continued)

(52) U.S. Cl.
CPC .......... *E21B 43/164* (2013.01); *E21B 41/0064* (2013.01); *E21B 21/00* (2013.01); *E21B 43/114* (2013.01); *E21B 2043/0115* (2013.01); *Y02C 10/14* (2013.01)

(58) Field of Classification Search
CPC ....... E21B 43/26; E21B 43/267; E21B 37/06; E21B 43/114; E21B 21/00; C09K 8/703
See application file for complete search history.

(56) References Cited

U.S. PATENT DOCUMENTS

| 5,076,357 A | 12/1991 | Marquis |
| 5,358,046 A | 10/1994 | Sydansk et al. |

(Continued)

FOREIGN PATENT DOCUMENTS

| WO | 2008/070035 | 6/2008 |
| WO | 2009/060177 | 5/2009 |

(Continued)

OTHER PUBLICATIONS

WO PCT/US2012/027442 Search Rep., Jan. 17, 2013, Battelle Memorial Institute.

(Continued)

*Primary Examiner* — Zakiya W Bates
(74) *Attorney, Agent, or Firm* — Wells St. John P.S.

(57) ABSTRACT

Downhole fluid injection systems are provided that can include a first well extending into a geological formation, and a fluid injector assembly located within the well. The fluid injector assembly can be configured to inject a liquid $CO_2$/$H_2O$-emulsion into the surrounding geological formation. $CO_2$ sequestration methods are provided that can include exposing a geological formation to a liquid $CO_2$/$H_2O$-emulsion to sequester at least a portion of the $CO_2$ from the emulsion within the formation. Hydrocarbon material recovery methods are provided that can include exposing a liquid $CO_2$/$H_2O$-emulsion to a geological formation having the hydrocarbon material therein. The methods can include recovering at least a portion of the hydrocarbon material from the formation.

7 Claims, 8 Drawing Sheets

(51) Int. Cl.
*E21B 41/00* (2006.01)
*E21B 43/114* (2006.01)
*E21B 43/01* (2006.01)

(56) References Cited

U.S. PATENT DOCUMENTS

| | | | |
|---|---|---|---|
| 5,912,424 | A | 6/1999 | Judkins et al. |
| 5,972,077 | A | 10/1999 | Judkins et al. |
| 6,375,716 | B1 | 4/2002 | Burchell et al. |
| 2008/0066918 | A1 | 3/2008 | Smith |
| 2012/0118586 | A1 | 5/2012 | Kameyama et al. |

FOREIGN PATENT DOCUMENTS

| | | |
|---|---|---|
| WO | 2011/019053 | 2/2011 |
| WO | PCT/US2012/027442 | 1/2013 |
| WO | PCT/US2012/027442 | 9/2013 |

OTHER PUBLICATIONS

WO PCT/US2012/027442 Written Opi., Jan. 17, 2013, Battelle Memorial Institute.

Annual Report, "Metal-Organic Clathrate Sorbents (MOCS) for Post-Combustion CO2 Capture Applications", Battelle Project No. 55219, 2009.

Gale et al., "Organized Molecular Assemblies in the Gas Phase: Reverse Micelles and Microemulsions in Supercritical Fluids", Journal of the American Chemical Society, 109, 1987, pp. 920-921.

Glezakou et al., "Spontaneous Activation of CO2 and Possible Corrosion Pathways on the Low-Index Iron Surface Fe(100)", Journal of the American Chemical Society, 113, 2009, pp. 3691-3696.

Henninger et al., "MOFs as Adsorbents for Low Temperature Heating and Cooling Applications", Journal of the American Chemical Society, 131, 2009, pp. 2776-2777.

Johnston et al., "Water-in-Carbon Dioxide Microemulsions: An Environment for Hydrophiles Including Proteins", Science, vol. 271, 1996, pp. 624-626.

McGrail et al., "An Initial Study of Precombustion CO2 Capture Using Organic Solid Sorbents and Advanced Compression Technology", PNNL-17241, May 2008.

McGrail et al., "Using Carbon Dioxide to Enhance Recovery of Methane from Gas Hydrate Reservoirs: Final Summary Report", PNNL-17035, Sep. 2007.

McGrail et al., "Water Reactivity in the Liquid and Supercritical CO2 Phase: Has Half the Story Been Neglected?", ScienceDirect, Energy Procedia 1 (2009) pp. 3415-3419.

Spycher et al., "CO2—H2O Mixtures in the Geological Sequestration of CO2.1. Assessment and Calculation of Mutual Solubilities from 12 to 100° C. and up to 600 Bar", Geochimica et Cosmochimica Acta, vol. 67, No. 16, 2003, pp. 3015-3031.

White et al., "Comparative Assessment of Advanced Gas Hydrate Production Methods", PNWD-4081 Final Technical Report, Jul. 2009.

White et al., "Numerical Studies of Methane Hydrate Production at Moderate Temperatures via Carbon Dioxide Exchange", PNNL Hydrology Group.

DOWNHOLE FLUID INJECTION SYSTEMS, $CO_2$ SEQUESTRATION METHODS, AND HYDROCARBON MATERIAL RECOVERY METHODS

CROSS REFERENCE TO RELATED APPLICATION

This application claims priority to U.S. Provisional Patent Application No. 61/448,879 which was filed on Mar. 3, 2011, entitled "Downhole Fluid Injection Systems, $CO_2$ Sequestration Methods, and Hydrocarbon Material Recovery Methods", the entirety of which is incorporated by reference herein.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The present disclosure relates to downhole fluid injection technology generally and more specifically to $CO_2$ sequestration methods, hydrocarbon material recovery methods, and downhole fluid injection systems that may be used to perform same.

BACKGROUND

Microemulsions are described as clear, thermodynamically stable solutions that generally contain $H_2O$, a surfactant, and an oil. $H_2O$ and $CO_2$ microemulsions first appeared in the literature during the 1990's and appear to document the use of a surfactant to create these mixtures. The first reported microemulsions in highly compressible fluids (ethane and propane) under supercritical conditions was by Gale et al. (1987). This early work utilized the surfactant sodium bis(2-ethylhexyl) sulfosuccinate to emulsify the mixture of supercritical fluids and $H_2O$. Microemulsions with supercritical $CO_2$ were initially reported by Johnston et al. (1996) where the chemical ammonium carboxylate perfluoropolyether was used as the surfactant. Creating microemulsions from liquid $CO_2$ (supercritical conditions) was originally accomplished by Eastoe et al., but required a partially fluorinated, di-chain surfactant bis(1H,1H,5H-octafluoro-n-pentyl) sodium sulfosuccinate (di-$HCF_4$) and the stability of the mixture temperature and pressure dependent.

Although recent estimates (Milkov et al. 2003) put the global accumulations of natural gas hydrate at 3,000 to 5,000 trillion cubic meters (TCM), compared against 440 TCM estimated (Collett, 2004) for conventional natural gas accumulations, how much gas could be produced from these natural gas hydrate deposits remains speculative. What is needed to convert these gas-hydrate accumulations to recoverable reserves are technological innovations sparked through sustained scientific research and development. As with the unconventional energy resources, the challenge is to first understand the resource, it's coupled thermodynamic and transport properties, and then address production challenges. Carbon dioxide sequestration coupled with hydrocarbon resource recovery is often economically attractive. Use of $CO_2$ for enhanced recovery of oil, conventional natural gas, and coal bed methane are in various stages of common practice.

Exchanging $CO_2$ with $CH_4$ has demonstrated $CO_2$ to be preferentially clathrated over $CH_4$ in the hydrate phase. During the exchange process, it has been observed that the mole fraction of $CO_2$ in the hydrate phase was greater than the gas phase. This effect was quantified by noting the gas phase mole fractions of hydrate formers (i.e. $CH_4$ and $CO_2$) above 40% $CO_2$ yielded hydrate phase mole fractions of $CO_2$ in the hydrate phase greater than 90%. Pure $CH_4$ and $CO_2$ form hydrates, and their mixture also form hydrates. In forming mixed $CH_4$ and $CO_2$ hydrates, the $CH_4$ molecules occupy both the large and small cages of these hydrates, whereas the $CO_2$ molecules only occupy the large cages. Without hydrate disassociation, there is an upper limit to the substitution of $CO_2$ for $CH_4$ in hydrates. It has been estimated approximately 64% of $CH_4$ could be released via exchange with $CO_2$. In addition to equilibrium considerations, the heat of $CO_2$ hydrate formation is greater than the heat of dissociation of $CH_4$ hydrate, which is favorable for the natural exchange of $CO_2$ with $CH_4$ hydrate, because the exchange process is exothermic. There are considerable numbers of open literature publications on the $CO_2$—$CH_4$ gas exchange concept.

SUMMARY OF THE DISCLOSURE

Downhole fluid injection systems are disclosure that can include a first well extending into a geological formation, and a fluid injector assembly located within the well. The fluid injector assembly can be configured to inject a liquid $CO_2$/$H_2O$-emulsion into the surrounding geological formation.

$CO_2$ sequestration methods are provided that can include exposing a geological formation to a liquid $CO_2$/$H_2O$-emulsion to sequester at least a portion of the $CO_2$ from the emulsion within the formation.

Hydrocarbon material recovery methods are provided that can include exposing a liquid $CO_2$/$H_2O$-emulsion to a geological formation having the hydrocarbon material therein. The methods can include recovering at least a portion of the hydrocarbon material from the formation.

BRIEF DESCRIPTION OF THE DRAWINGS

Preferred embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
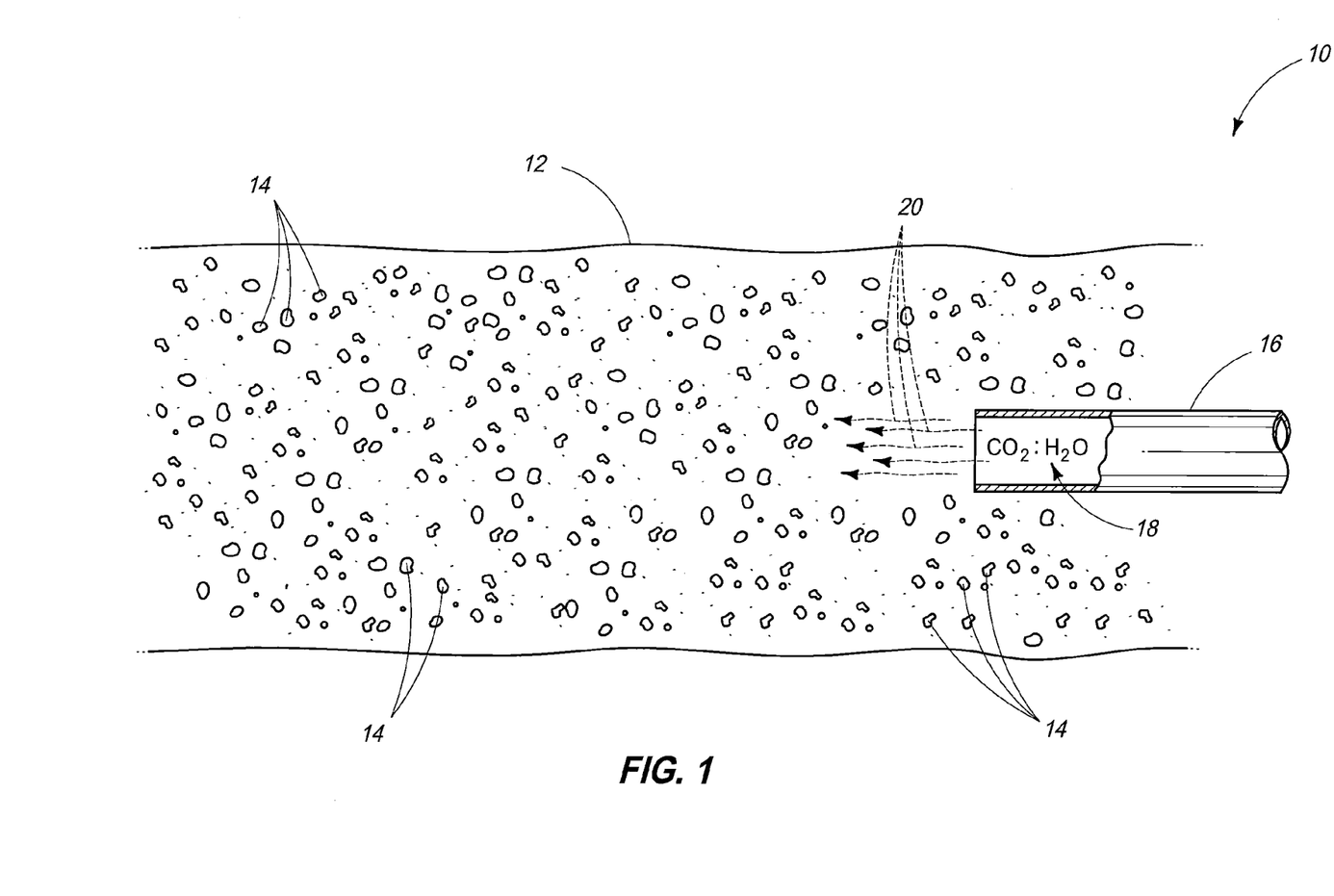
FIG. 1 is a depiction of a system and/or method according to embodiments of the present disclosure.

The systems and methods of the present disclosure are described with reference to FIGS. 1-8. Referring first to FIG. 1, a system 10 including a conduit 16 extending into a geological formation 12 is shown. Within conduit 16 is conveyed to geological formation 12 a liquid $CO_2/H_2O$-emulsion. This emulsion can be prepared according to the embodiments disclosed herein and detailed further below. The geological formation 12 is a formation including pores 14 of varying size. The pores may or may not contain desired materials. In certain circumstances where the pores contain desired materials, the pores may contain hydrocarbon materials such as methane and other hydrocarbon materials extending to larger chain hydrocarbon materials such as crude oil.

Figure 2:
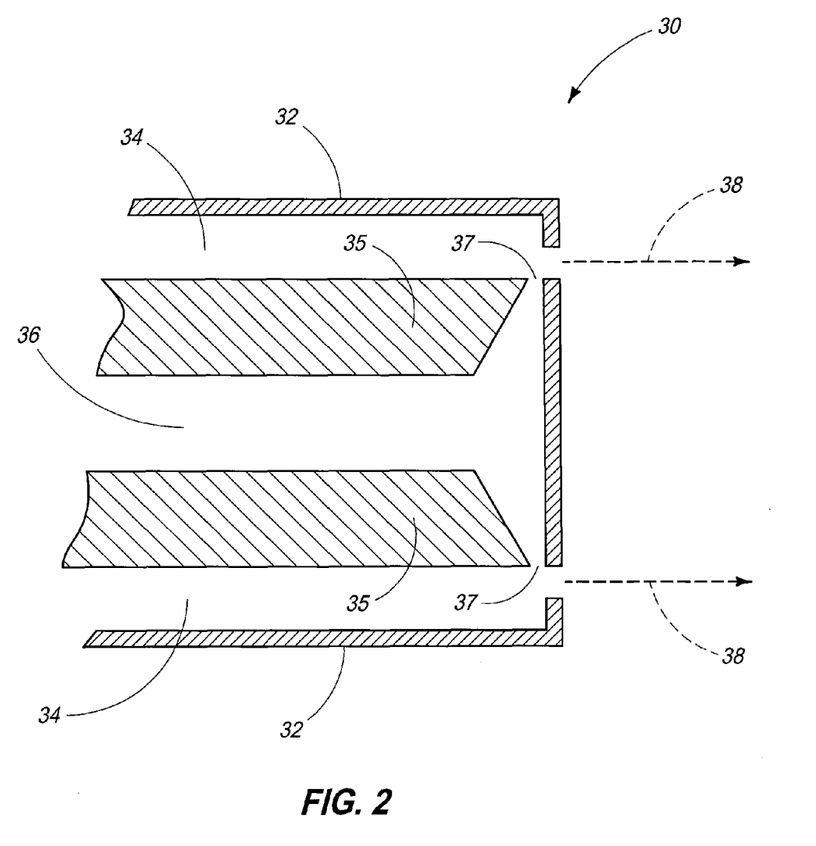
FIG. 2 is an assembly according to embodiments of the present disclosure.

Referring to FIG. 2, a $CO_2/H_2O$-emulsion can be prepared utilizing assembly 30 of FIG. 2. Assembly 30 of FIG. 2 can take the form of an injector that may be utilized within a down borehole well. In accordance with one configuration, at least a portion of the injector can assembled as a tube within a tube, for example. In this example configuration, tube 32 can have tube 35 therein. Accordingly, a conduit or channel 34 is formed between tube 32 and tube 35. Within this conduit or channel can be conveyed liquid $H_2O$, for example. Within tube 35, a conduit or channel 36 is defined, and within this conduit or channel 36, liquid $CO_2$ can be conveyed. As depicted in FIG. 2, outlets 38 extend longitudinally along the same longitudinal axis as conduits 34. As $H_2O$ traverses conduit 34, it can cleave or remove portions of $CO_2$ as the $CO_2$ traverses or intersects with conduit 34 at intersect 37, for example. In example embodiments, intersect 37 of conduits 34 and 36 can be normal to one another. As depicted, intersect 37 demonstrates a partially beveled conduit 36 as it intersects conduit 34. In accordance with example implementations, the $CO_2/H_2O$-emulsion can be a $CO_2/H_2O$-microemulsion. The microemulsion can have $CO_2$ portions existing in micron or submicron sizes, for example.

Figure 3:
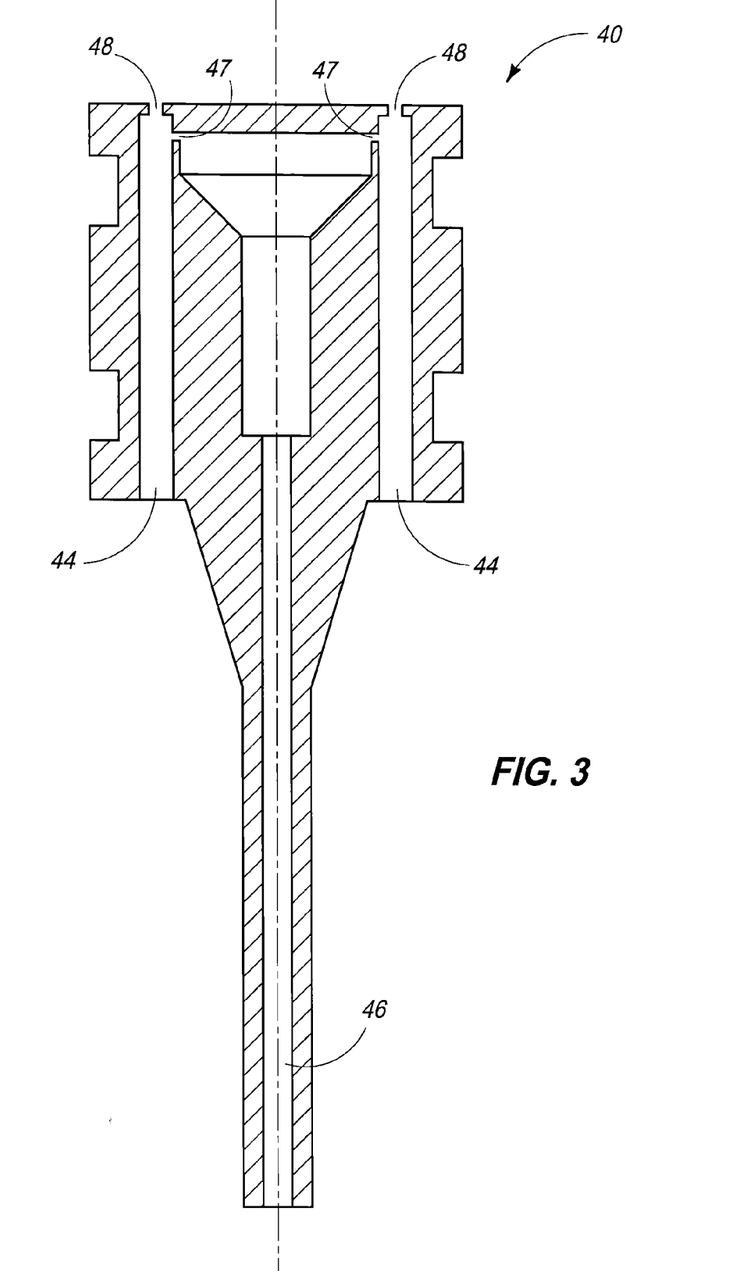
FIG. 3 is another assembly according to embodiments of the present disclosure.

Referring to FIG. 3, an experimental injector 40 is shown that includes conduits 44 configured to convey liquid $H_2O$, and conduit 46 that is configured to convey liquid $CO_2$. As depicted, experimental injector 40 includes a conduit 47 that extends normally to conduit 44 and intersects conduit 46 with conduit 44. Experimental injector 40 also includes outlets 48 longitudinally aligned with the length of conduit 44. Injector 40 also includes recesses that may be utilized to house O-rings to provide a sufficient seal within an experimental apparatus. According to example implementations, liquid $H_2O$ is provided through conduits 44 and exiting outlets 48 while liquid $CO_2$ is provided through conduit 46 and exiting through intersection 47 into conduit 44. According to example implementations, as $H_2O$ is exiting into opening 48, portions of $CO_2$ are cleaved as they pass out of intersect 47, thereby forming a $CO_2/H_2O$-emulsion as the outlet product of injector 40. The injectors of the present disclosure can be manufactured of stainless steel, for example.

Figure 4:
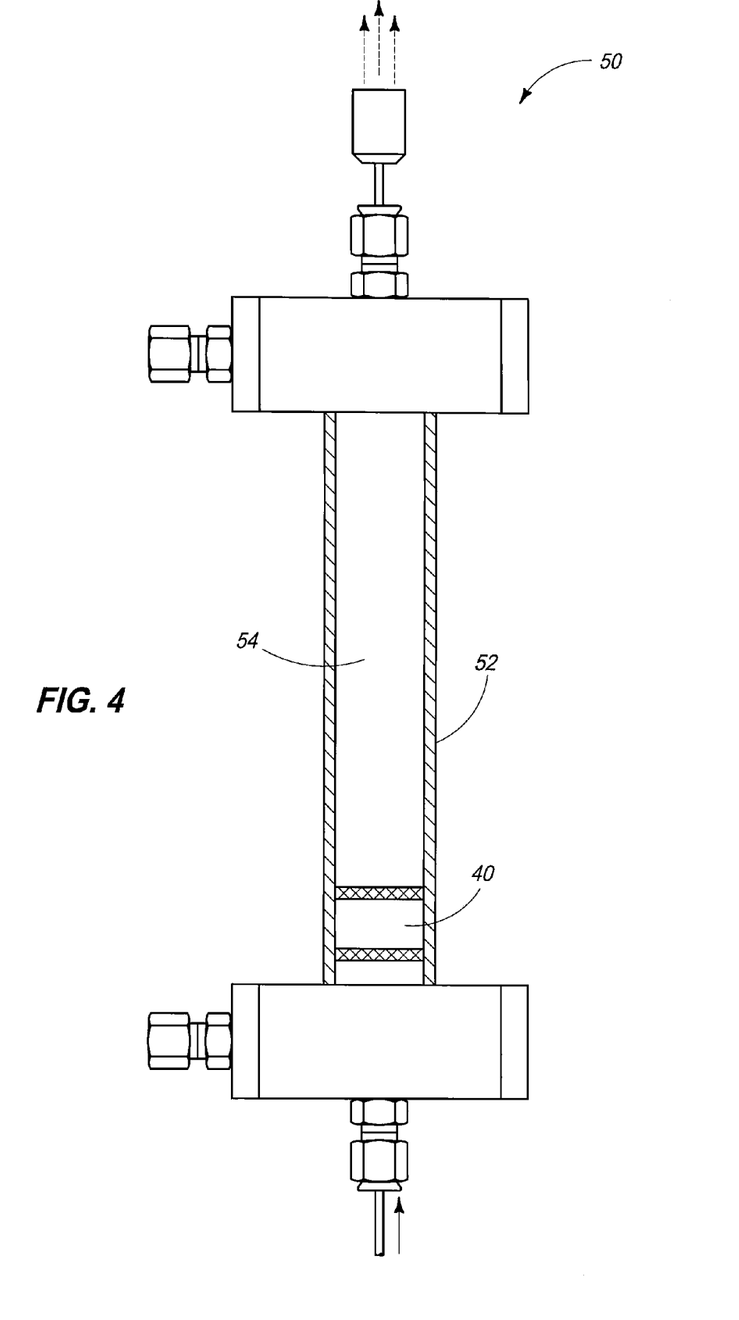
FIG. 4 is an experimental assembly according to embodiments of the present disclosure.

Referring to FIG. 4, a test assembly 50 is shown that depicts a commercially available thin walled sapphire tube rated at 1300 psig pressure. Other columns, including Hydex 301, may also be utilized. Injectors such as the injector 40 depicted in FIG. 3 can be positioned towards the bottom of device 50, and injector 40 can be coupled to syringe pumps used to deliver both the liquid $CO_2$ and liquid $H_2O$ at the predetermined pressures. Parameters for the syringe pumps can be selected and maintained at constant pressure, if desired. Initially, assembly 50 can be pressurized to 1000 psig with $H_2O$ through the $H_2O$ inlet conduit. An expansion volume port can be utilized and coupled to another cell to provide back pressure to the cell. Syringe pumps can be programmed to maintain back pressure of 950 psig which approximately 50 psig less than another pump utilized.

After $H_2O$ flow is established through the injector, liquid $CO_2$ can be injected through another syringe pump at half the rate of the rate of injection of the $H_2O$ (25 ml/min., for example). Upon injection of $CO_2$, a microemulsion can be formed at high velocity in $H_2O$ streams exiting injector 40 and may be visually observed within sapphire tube 52 as microemulsion 54. According to example implementations, injector 40 can include four outlets, each one producing a stream of $CO_2/H_2O$-emulsion. It can be demonstrated that emulsions can be formed at different ratios of $H_2O$ to $CO_2$ by changing the injection rates of $H_2O$ and $CO_2$, for example, and with varying injection rates, the microemulsion can be formed.

Figure 5:
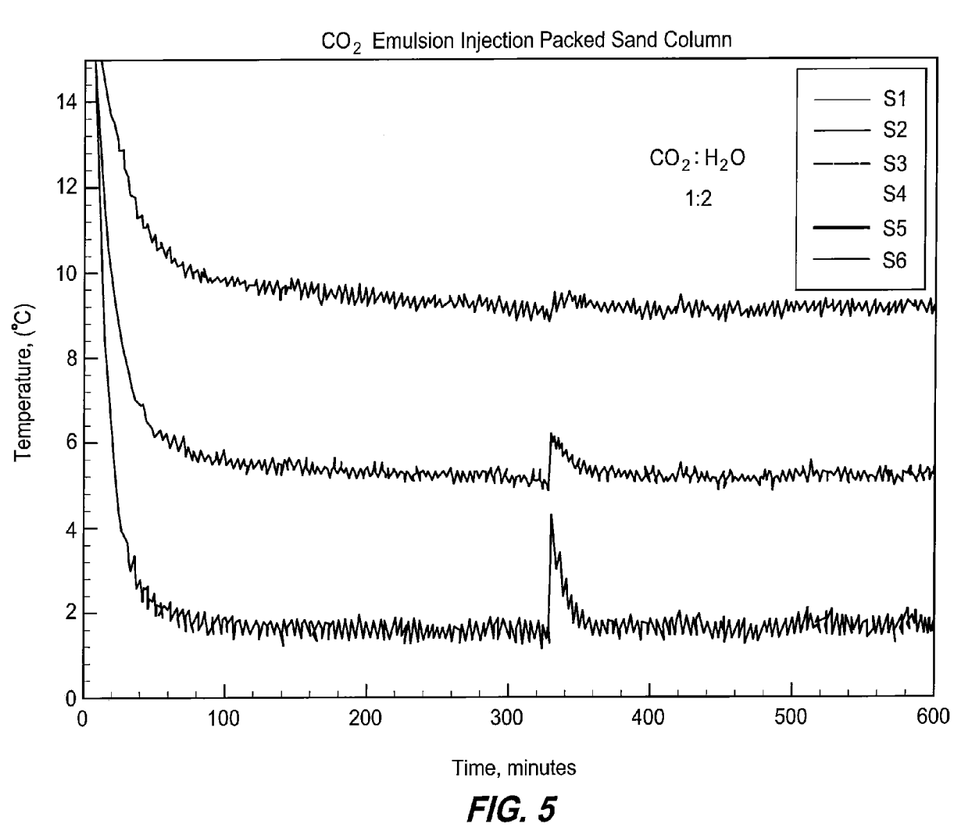
FIG. 5 is data acquired utilizing the experimental assembly of FIG. 4 according to embodiments of the present disclosure.

In accordance with another example implementation, quartz tube 52 can be packed with hydrated quartz sand having a final $H_2O$ content of 80% pore volume and thermally cooled to 2° C. The sand can be pressurized with $CH_4$ gas to 1300 psi to form a $CH_4$ hydrate spontaneously. The hydrate may be observed as small white spots in the pore sand and then may rapidly grow in all directions until complete coverage of tube 52 is observed. Upon formation of the $CH_4$ hydrate, injection of a $CO_2/H_2O$-micromulsion can be initiated. Utilizing syringe pumped control pressure, $H_2O$ and $CO_2$ can be delivered into column 52 at a ratio of 2:1. As the microemulsion enters the cell, the $CH_4$ hydrate can be observed dissociating and leaving behind pores filled with $H_2O$ and $CO_2$ microemulsion. During application of the microemulsion, the column can reach temperatures of 21° C., and upon termination, the column can return to pre-injection temperature of 2° C. Conversion of $CO_2$ microemulsion into $CO_2$ hydrate can be observed and the $CH_4$ recovered from the column. Referring to FIG. 5 of the present disclosure, a temperature profile of column 52 observed during application of a microemulsions is depicted in graphical form.

Figure 6:
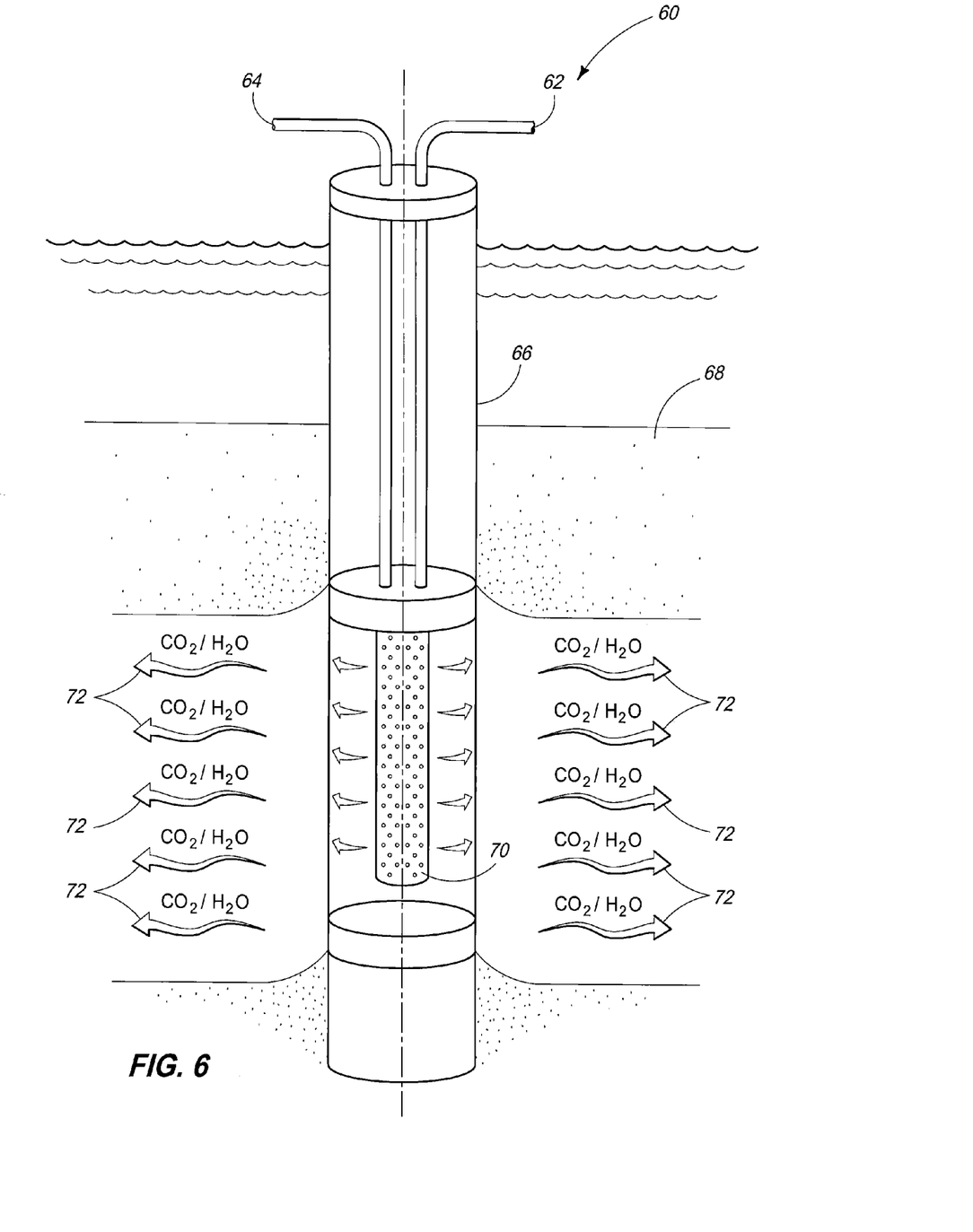
FIG. 6 is a system according to embodiments of the present disclosure.

Referring to FIG. 6, a wellbore configuration of a system according to the present disclosure is depicted and this wellbore configuration 60 can include $H_2O$ and $CO_2$ inlets 62 and 64, respectively. These $H_2O$ and $CO_2$ inlets can enter down through a well casing 66 into a geological formation 68, where they can be provided to an injector assembly 70. This injector assembly can provide liquid $CO_2/H_2O$-emulsions within geological formation 68. The $CO_2/H_2O$-emulsions can be provided to one or both of sequester $CO_2$ and/or recover desirable hydrocarbons such as methane in clathrated form, for example.

Figure 7:
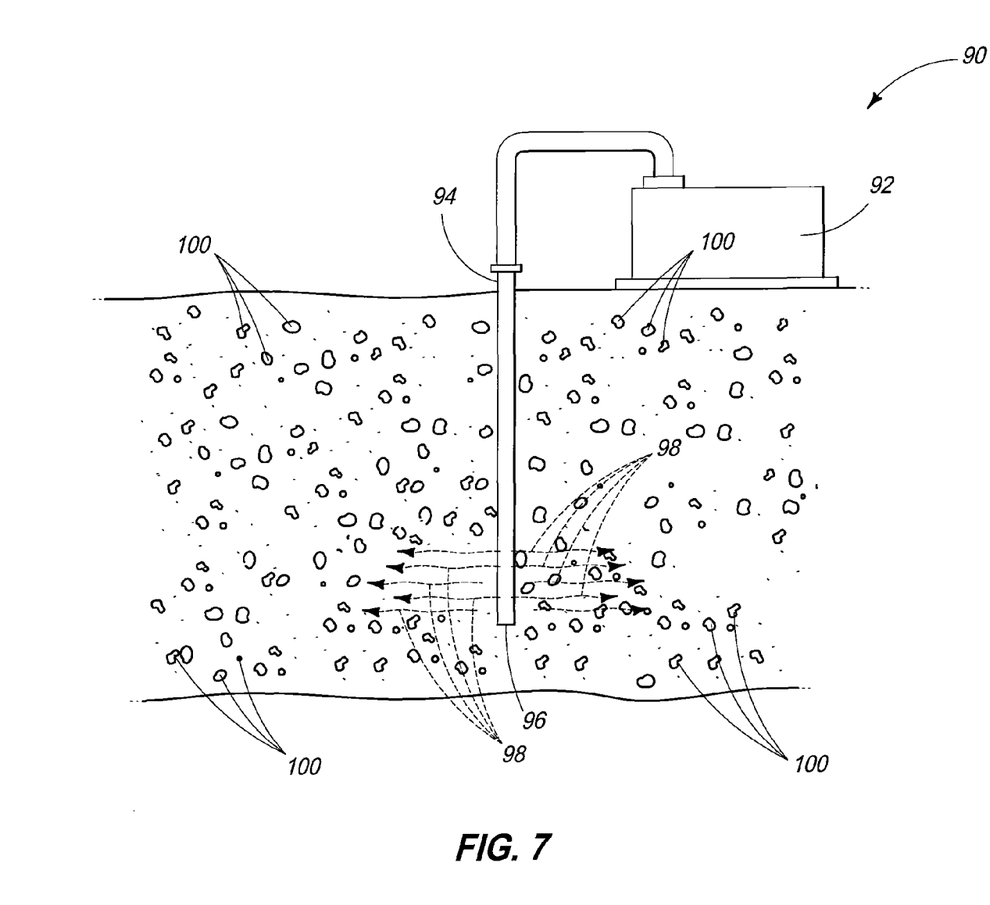
FIG. 7 is a system according to embodiments of the present disclosure.

Referring to system 90 of FIG. 7, the system includes a $CO_2$ source 92. This source can be in the form of power plant $CO_2$. In other implementations, source 92 can be in the form of $CO_2$ shipped to the borehole site in tank form. $CO_2$ supply 92 can be connected to down borehole system 94, which includes at least two conduits, one conduit including $CO_2$ and another conduit including $H_2O$. From this down borehole, system 94 can extend to an injector placed within the down borehole rig, and this injector can be configured to provide a $CO_2/H_2O$-emulsion to within geologic formation 100. Injector 96 can be configured as described previously and convey a $CO_2/H_2O$-emulsion and/or $CO_2/H_2O$-microemulsion for example.

According to example implementations, $CO_2$ within the $CO_2/H_2O$-emulsions can be sequestered into geologic formation 100 by exchanging or sequestering $CO_2$ within the pores of geological formation 100. The injector can be designed to function down borehole under conditions typical of gas-hydrate formations which can be found at sea bottoms, as well as under permafrost areas. Wellbore completion requirements such as open hole, encased, or perforated casing may influence design parameters of the injector. Injection of liquid $CO_2$ and liquid $H_2O$ can be performed directly into the target formation according to embodiments described herein, for example.

The design of the injector to deliver the microemulsion radially away from the down borehole into the formation of interest may be desirable. This may be accomplished by repositioning the emulsion outlets from the top of the injector tool previously described to the sides as shown in the schematic previously in FIG. 6. A microemulsion in this configuration can occur as high velocity $H_2O$ can shear off droplets of liquid $CO_2$ before penetrating the target formation. Both rate and distance of formation penetration can be controlled from the surface by adjusting liquid $CO_2$ and liquid $H_2O$ pumps, for example.

Figure 8:
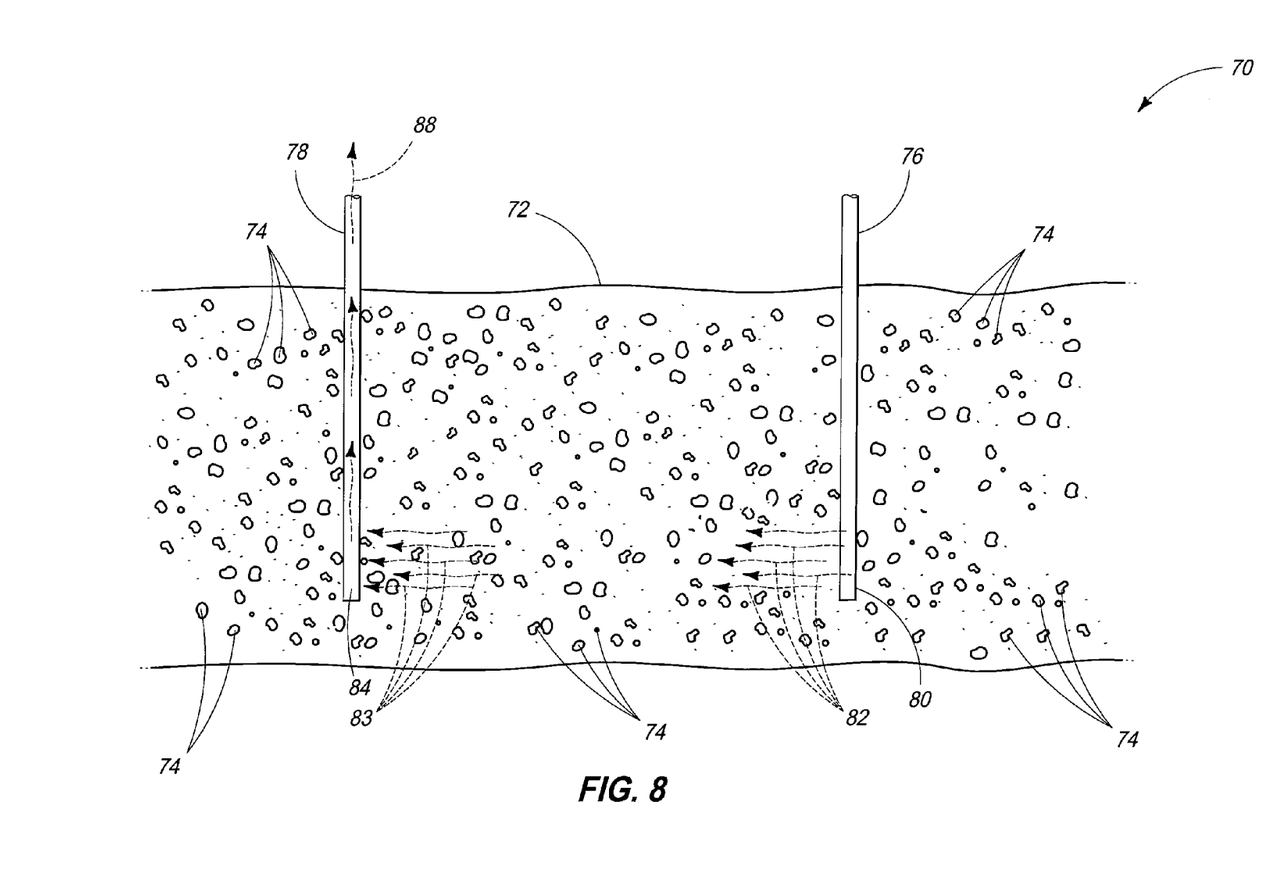
FIG. 8 is a system according to embodiments of the present disclosure.

Referring lastly to FIG. 8, a system 70 includes at least two wells 76 and 78 respectively with at least one of the wells being a down borehole injection well such as well 76 having injector 80 configured to expose geologic formation 74 with $CO_2/H_2O$-emulsion 82. Another of the wells of system 70 can be a recovery well such as recovery well 78 having receiving openings 84 configured to receive materials such as hydrocarbon materials from geologic formation 74. In accordance with example implementations, formation 74 can include porous materials having hydrocarbon material therein. As an example, formation 74 can include methane deposits and/or or other larger chain length deposits up to and including crude oil deposits. In accordance with other implementations, formation 74 can include enclathrated methane such as methane hydrate formations. Upon exposing formation 74 to emulsion 82, at least some of the $CO_2$ of emulsion 82 can replace at least some of the hydrocarbon material of formation 74. The replaced hydrocarbon material can migrate toward well 78 and be recovered. According to specific implementations, methane may be the hydrocarbon material that is recovered from formation 74. In particular embodiments, methane may occupy pores of formation 74 and/or may be enclathrated as a hydrate, for example. Upon exposing formation 74 to $CO_2/H_2O$-emulsion 82, the $CO_2$ of emulsion 82 may occupy at least some of the pores once occupied by the methane. In accordance with this embodiment, $CO_2$ may be sequestered while simultaneously recovering methane from the formation.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A downhole fluid injection system comprising:
   an injection well extending into a geological formation;
   a fluid injector assembly located at the terminus of the well, the injector assembly configured as a tube within a tube, the fluid injector assembly configured to inject a liquid $CO_2/H_2O$-emulsion into the surrounding geological formation;
   a $CO_2$ reservoir in fluid communication with the injection well;
   a $H_2O$ reservoir in fluid communication with the injection well; and
   wherein the fluid injector assembly defines one conduit in fluid communication with the $CO_2$ reservoir and another conduit in fluid communication with the $H_2O$ reservoir.

2. The system of claim 1 wherein the fluid injector assembly is configured to mix liquid $CO_2$ and liquid $H_2O$ to form the liquid $CO_2/H_2O$-emulsion.

3. The system of claim 1 wherein the fluid injector assembly comprises:
   a first conduit and a second conduit intersecting the first conduit, the injector configured to convey liquid $H_2O$ through the first conduit and liquid $CO_2$ through the second conduit; and
   an outlet conduit extending in substantially the same longitudinal direction as the first conduit.

4. The system of claim 1 wherein the fluid injector assembly comprises a first conduit and a second conduit intersecting and normal to the first conduit, the injector configured to convey liquid $H_2O$ through the first conduit and liquid $CO_2$ through the second conduit.

5. The system of claim 1 further comprising a recovery well extending into the geological formation.

6. The system of claim 5 wherein the geological formation comprises hydrocarbon materials.

7. The system of claim 6 wherein the recovery well is configured to receive hydrocarbon materials from the geological formation and provide them to a location away from the geological formation.

* * * * *